Oct. 30, 1956

J. F. KINCAID 2,768,618

INLET PASSAGE AND VALVE FOR
INTERNAL COMBUSTION ENGINE

Filed March 24, 1953

J. F. KINCAID 2,768,618

INLET PASSAGE AND VALVE FOR
INTERNAL COMBUSTION ENGINE

Filed March 24, 1953

United States Patent Office 2,768,618
Patented Oct. 30, 1956

2,768,618

INLET PASSAGE AND VALVE FOR INTERNAL COMBUSTION ENGINE

James F. Kincaid, Beacon, N. Y., assignor to The Texas Company, New York, N. Y., a corporation of Delaware Application March 24, 1953, Serial No. 344,278

4 Claims. (Cl. 123—191)

This invention relates to air induction systems for internal combustion engines, and more particularly to an improved inlet passage and valve combination for engines which require for their proper operation a swirling or rotation of the inducted air charge within the combustion chamber.

Various methods have been employed in the prior art to develop a swirling movement or rotation of the inducted air charge within the combustion chambers of engines. One known means for producing such air swirl consists of disposing the inlet passage in a tangential manner relative to the desired swirl orbit, thereby giving the inducted air the proper initial directivity, and choosing a passage size relative to the engine piston displacement such that the inducted air enters the combustion chamber in a confined stream at high velocity. Swirling movement of the air charge has also been created by employing a deflecting surface such as a shroud or vane at the inner end of the inlet passage or its valve, in order to direct the entering air into the proper path to produce the desired swirling movement around the combustion chamber.

These methods of creating air swirl, however, suffer from certain disadvantages. Among these is the reduction in the size of the inlet passage required to increase the velocity of the inducted air charge. Also the inclining of the passage sufficiently tangentially to direct the inlet air charge tangentially of a desired swirl path in the combustion chamber, as well as the alternative of employing air-deflecting shrouds or vanes, has a deleterious effect on the flow coefficient of the inlet passage. Tangentially inclined ports, moreover, generally require more complex valve structure than is often practical. Thus, in these prior art solutions to the problem of creating air swirl, when mechanical complexity is avoided, the combined effect of reduction in passage cross-sectional area and reduction in flow coefficient has resulted in a sacrifice in volumetric efficiency of the engine. It is an object of the present invention, therefore, to provide an improved internal combustion engine air induction system for creating a swirling motion or rotation of the inlet air charge in the engine combustion chamber, which substantially avoids the mechanical disadvantages attendant upon air swirl induction systems of the prior art.

It is another object to provide an improved air induction system of the aforesaid type for creating a high velocity swirling motion or rotation of the inducted air charge in the combustion chamber.

It is another object to provide an improved inlet passage and valve combination for creating a swirling motion or rotation of the inlet air charge in the combustion chamber of an internal combustion engine.

It is another object to provide an improved inlet passage and valve combination which is particularly suitable for development of a high rate of air swirl with high volumetric efficiency at high engine operating speeds.

It is another object to provide an inlet passage and valve combination which is particularly suitable for air induction with reduced fluid friction losses.

It is another object to provide an inlet passage and valve combination of the aforesaid type having an improved flow coefficient.

It is another object to provide an inlet passage and valve combination of the aforesaid type without shrouds, vanes or other auxiliary deflecting surfaces.

It is another object to provide an inlet passage and valve combination of the aforesaid type employing an unshrouded poppet valve, in which the relative orientation of passage and valve are such as to derive an improved cooperation between the passage and the valve surface in directing the inducted air into the desired flow path.

These and other objects and advantages of the invention will be apparent from the following description taken in connection with the accompanying drawings wherein.

Briefly, the present invention resides in the discovery that the air swirl producing ability of an air induction system can be improved, and its structural configuration substantially simplified over the prior art, by the elimination of all shrouds, vanes and other auxiliary air deflecting surfaces from the air inlet passage and valve of which it is comprised, and by changing the orientation of the valve from its conventional disposition with the valve face normal to the desired axis of air swirl to an inclined disposition such that the valve face makes an angle with the swirl axis of preferably 60° to 80°. With this arrangement, the cross-sectional area of the induction passage available for air flow, as well as its flow coefficient, is increased, thereby providing a resultant increase in engine volumetric efficiency. Moreover, the improved cooperation between passage and valve which results from their novel relative disposition results in an improved ability to confine and direct the inducted air in the desired manner for producing improved air swirl, thereby rendering unnecessary the use of any additional air deflecting surfaces.

Figure 1:
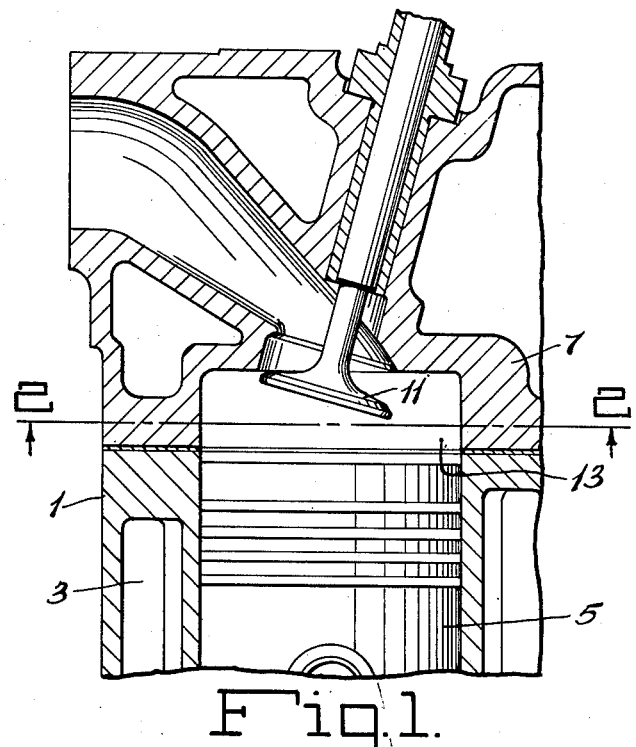
Fig. 1 is a sectional view of a portion of an internal combustion engine showing the environment of the present invention, the view being taken on the plane of line 1—1 of Fig. 2.
Figure 2:
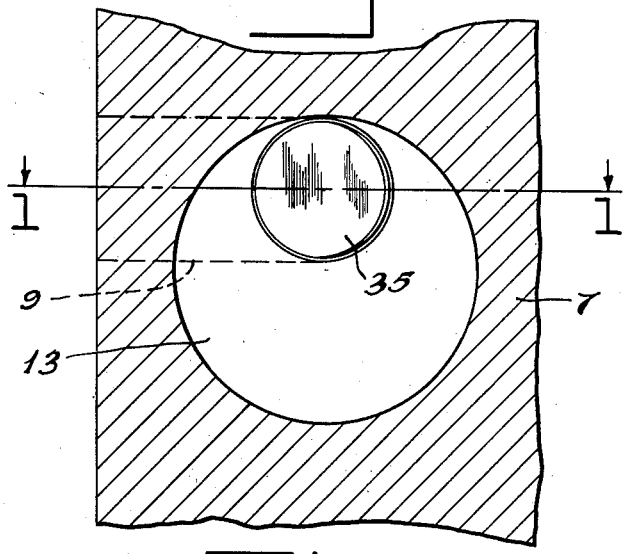
Fig. 2 is a horizontal sectional view taken on the plane of line 2—2 of Fig. 1.

Referring to Figs. 1 and 2 of the drawing, an engine cylinder is shown at 1 provided with a water jacket 3, piston 5 and a connecting rod, not shown, which is attached to the usual crankshaft, not shown.

Engine cylinder 1 is closed at its top by a cylinder head 7, having an induction air passage therein including an inlet passage 9 provided with an unshrouded poppet valve 11. During the suction stroke of piston 5, air or an equivalent fuel oxidizing agent necessary to support combustion is drawn through the air induction system into the combustion chamber 13 formed in cylinder 1 between piston 5 and head 7. The present invention is concerned with the configuration of this air induction system, and particularly with a novel arrangement of the intake passage and valve therein, affording an improved degree of cooperation by which is provided the desired swirling or rotating motion of the inducted air charge within the engine combustion chamber.

Figure 3:
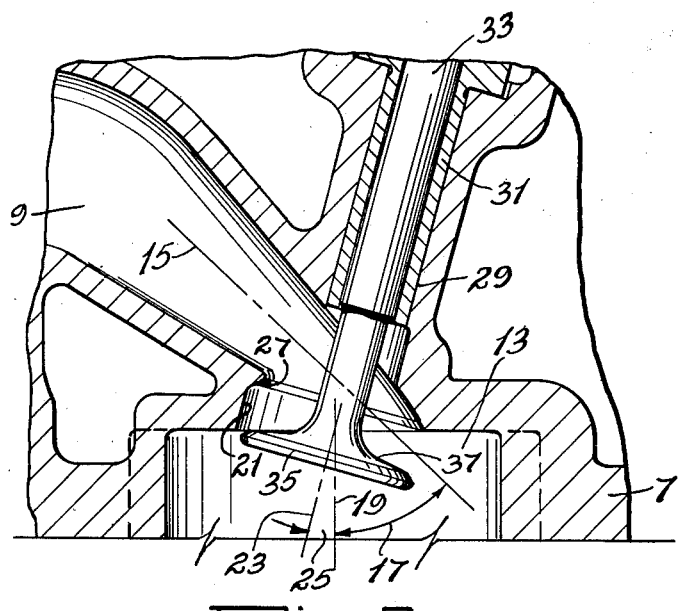
Fig. 3 is an enlarged view of a portion of Fig. 1.

As shown more particularly in Fig. 3, an improved air induction system constructed in accordance with the present invention includes an inlet passage 9, oriented in head 7 so that its axis of air flow 15 is disposed at an acute angle 17 relative to the predetermined axis about which it is desired to have the inducted air swirl. In the present illustrative embodiment this swirl axis coincides with the longitudinal axis 19 of cylinder 1. Preferably, the passage 9 is positioned so that its port at the outlet end is removed radially from the center of the cylinder by the largest distance practical. Generally, with a passage sized large enough to permit adequate air flow into the combustion chamber 13, this requirement will place the center of the outlet end of passage 9 at a radius of from 5/10 to 9/10 the radius of cylinder 1. Inlet passage 9 is also arranged so that its flow axis 15 lies in a plane which is both parallel to axis 19 of cylinder 1 and tangential to the desired circular air swirl path around the combustion chamber 13. With this disposition of inlet passage 9, inducted air flowing through the passage 9 is directed slightly downward into the combustion chamber 13, while at the same time being initially directed in the desired path of air flow about the cylinder axis 19 so that subsequent deflection by the walls of cylinder 1 swirls the inducted air about the cylinder axis in the desired manner. While the flow axis of inlet port 9 is preferably substantially straight, a pair of opposite walls of the passage are preferably gradually tapered in the direction of air flow, to provide a progressively decreasing cross-sectional area for the passage in the direction of air flow, and thereby progressively increase the air flow velocity.

At the outlet or combustion chamber end of the passage 9 comprising the inlet port, is provided a cylindrical counterbore 21 having an axis 23 which is disposed preferably at an angle 25 to the combustion chamber axis of from 10° to 30°, and coplanar with the flow axis 15 of inlet passage 9. The inner end of counterbore 21 is provided with a conical valve seat 27 disposed generally in a plane normal to the axis 23 of counterbore 21. Preferably, counterbore 21 is just deep enough to permit all of valve seat 27 to be enclosed within cylinder head 7. On the wall of inlet passage 9 opposite counterbore 21, the head 7 is provided with a cylindrical bore 29 disposed preferably coaxially with counterbore 21, and adapted to receive a cylindrical valve stem guide 31. The bore 29 is preferably constructed without a boss protruding into the inlet port 9, to avoid any discontinuity which might create turbulence in the port.

A valve stem 33 is supported in the valve stem guide 31, for reciprocation in engine-timed relation by means such as the usual rocker arm and push rod structure, not shown. At its inner or combustion chamber end, valve stem 33 carries a conventional disc-shaped poppet valve 35. The valve 35 is disposed preferably in a plane normal to the axis 23 of bore 29 and counterbore 21, and is chamfered for cooperative seating engagement with valve seat 27 to shut off air flow through inlet passage 9. The inner or tulip face 37 of valve 35 is generally flat, and thus when the valve is extended into the combustion chamber 13, in its open position, this face 37 acts as a ramp and serves to guide the inducted air emerging from the outlet end of inlet passage 9 into the combustion chamber 13 in the desired direction, i. e., slightly downward into the combustion chamber and generally tangential of the desired swirl orbit about the combustion chamber axis 19.

Preferably, the maximum lift of valve 35 is arranged so that, when the valve is fully lifted, the upstream side of the valve is approximately flush with the bottom of head 7. In this way air flow out of the inlet passage on that side of the valve will be substantially prevented. This prevents dissipation of the kinetic energy of the inducted air in a direction opposite that desired, and constricts the orifice of inlet passage 9 so that substantially all of the inducted air enters the combustion chamber with the directivity desired for a high swirl rate.

If desired, inlet passage 9 may be built up slightly in the region adjacent the upstream side of valve seat 27, so as to provide sufficient strength at that portion of the valve seat to withstand the impact of seating of valve 35 during engine operation.

An inlet passage and valve combination constructed in accordance with the present invention has many advantages over air induction systems of the prior art. It will be apparent that elimination of auxiliary deflecting surfaces such as shrouds, vanes, and the like, conventionally employed to produce air swirl, and transfer of their air directing function to the valve face itself, results in a substantial increase in the cross-sectional area of the air induction passage available for air flow, while at the same time improving its flow coefficient, and thereby enabling engine operation at higher volumetric efficiencies. Also, elimination of a shroud or vane from the valve 35 allows the valve and valve stem 33 to be rotated through 360° during engine operation, thereby affording a more even distribution of wear at valve seat 27 and omitting the necessity for pinning or keying the valve stem 33 in its guide 31 to prevent shroud rotation. Moreover, elimination of such non-symmetrical surfaces from the valve 27 eliminates any problems which may arise due to uneven weight distribution across the valve. Additionally, with a passage and valve combination constructed as heretofore described, air swirling within the combustion chamber will strike the inclined lower face of the valve at a comparatively small angle of incidence, and will be deflected smoothly past the valve. With shrouded valves reciprocating vertically, i. e., parallel to swirl axis 19, the full area of the valve shroud is projected at right angles into the swirling air path when the valve opens and thus causes a severe drag on the swirling air. Thus, a passage and valve combination constructed in accordance with the present invention has a reduced tendency to interfere with the swirling air flow in the combustion chamber when the valve is open.

Thus, there has been shown and described an improved air induction system for air swirl internal combustion engines including an improved inlet passage and valve combination wherein the inlet passage is inclined to give the proper initial direction to the inducted air stream, and the cooperating valve is of the simple poppet type, also inclined at an angle sufficient to enhance the directivity of the inducted air in the desired manner without the necessity of shrouds, vanes, or other undesirable auxiliary air deflecting surfaces. The passage and valve combination herein disclosed thus provides for an improvement in air swirl rate without the sacrifice in mechanical simplicity or volumetric efficiency attendant in prior art air induction systems.

Obviously many modifications and variations of the invention, as hereinbefore set forth, may be made without departing from the spirit and scope thereof, and therefore only such limitations should be imposed as are indicated in the appended claims.

I claim:

1. An improved air induction system for providing air swirl about a predetermined axis in the combustion chamber of an internal combustion engine comprising a tubular intake passage ending at the outlet end thereof as a port into said combustion chamber, said passage having a substantially straight line flow axis disposed at an acute angle to said predetermined axis and tangential to the circular direction of air swirl and lying in a plane parallel to said predetermined axis, said passage having a cross section decreasing progressively in area in the direction of flow up to the immediate vicinity of the plane normal to said flow axis and passing through the upstream edge of said port, said port including a valve seat, and a valve adapted to cooperate with said valve seat, the face of said valve being disposed in a plane perpendicular to the plane containing the passage flow axis and intersecting said predetermined axis at an angle of 60° to 80°, said straight line flow axis extending throughout that portion of said passage with decreasing cross sectional area and projecting unhindered through said port in the outlet end of said passage into said combustion chamber for free passage of air thereinto when said valve is in fully open position.

2. An improved air induction system as set forth in claim 1, wherein said predetermined axis in the combustion chamber is the longitudinal axis thereof, said tubular intake passage has a pair of opposite wall portions converging toward the outlet end thereof, said plane containing said straight line flow axis being disposed at a radius of from .5 to .8 that of the radius of said chamber, said outlet end of said intake passage having a counterbore with its longitudinal axis in the plane of said flow axis and disposed at an angle of from 10° to 30° with respect to said predetermined axis, said valve seat being located in said counterbore and disposed normal to the counterbore axis, and a generally disc-shaped poppet valve adapted to co-operate with said valve seat.

3. In an internal combustion engine of the reciprocating piston type operating with induction air swirl, the combination with a cylinder having a disc-shaped combustion chamber of an air induction system for providing air swirl about the longitudinal axis of said combustion chamber comprising a tubular air intake passage ending at its outlet end as an intake port in the end of said combustion chamber and having a pair of opposite wall portions converging toward the outlet end thereof and defining a substantially straight line flow axis and a progressively decreasing cross-sectional area in the direction of air flow, said intake passage flow axis being disposed at an acute angle to said longitudinal axis of said combustion chamber and lying in a plane parallel to said combustion chamber axis and perpendicular to a combustion chamber radius bisecting the outlet end of said passage at a radius of from .5 to .8 that of the radius of said cylinder, a valve seat in the outlet end of said intake passage, said valve seat lying in a plane normal to the plane containing said passage flow axis and disposed at an angle to said combustion chamber axis of from 60 to 80 degrees, a counterbore in the wall portion of said intake passage opposite said valve seat having an axis normal to the plane of said valve seat, a valve stem supported within said counterbore, and a disc-shaped poppet valve supported on said valve stem normal thereto and adapted to be reciprocated into closing and opening relation with said valve seat, said valve having a maximum lift such that its upstream side is flush with the bottom of said cylinder head when fully opened, said straight line flow axis extending throughout that portion of the passage having said decreasing cross sectional area and projecting through the outlet end thereof into said combustion chamber for unhindered passage of air thereinto when said valve is in fully open position.

4. In an internal combustion engine of the reciprocating piston type operating with induction air swirl, the combination with a cylinder having a disc-shaped combustion chamber of an air induction system for providing air swirl about the longitudinal axis of said combustion chamber comprising a tubular air intake passage ending at its outlet end as a port in the head of said cylinder and having a pair of opposite wall portions converging toward the outlet end thereof and defining a substantially straight line flow axis and a cross section decreasing progressively in area in the direction of air flow, said passage flow axis being disposed at an acute angle to said axis of said combustion chamber and contained in a plane parallel to said combustion chamber axis and perpendicular to a combustion chamber radius bisecting the outlet end of said passage at a radius of .5 to .8 thereof, a cylindrical counterbore in the outlet end of said passage having an axis lying in said plane containing said passage flow axis and disposed at an angle to said intake passage axis of from 10 to 30° larger than said acute angle, a valve seat circumferentially disposed in said counterbore, a disc-shaped poppet valve in said counterbore disposed normal to said counterbore axis and adapted to be reciprocated into opening and closing relation with said valve seat, and said valve having a maximum lift such that its upstream side is flush with the bottom of said cylinder head when fully open, said straight line flow axis extending throughout that portion of the passage having the converging wall portions and projecting through the outlet end into said combustion chamber for free passage of air thereinto when said valve is in fully open position.

References Cited in the file of this patent

UNITED STATES PATENTS

| | | |
|---|---|---|
| 1,374,158 | Inshaw | Apr. 5, 1921 |
| 1,733,696 | Ricardo | Oct. 29, 1929 |
| 2,457,652 | Fisher | Dec. 28, 1948 |

FOREIGN PATENTS

| | | |
|---|---|---|
| 23,656 | France | July 26, 1921 |
| 423,316 | Great Britain | Jan. 30, 1935 |